(12) United States Patent
Yang et al.

(10) Patent No.: US 6,368,006 B1
(45) Date of Patent: Apr. 9, 2002

(54) ATTACHMENT MECHANISM FOR STROLLER TRAY ACCESSORY

(75) Inventors: Cheng-Fan Yang; Yung-Fu Yu, both of Tai Pao (TW)

(73) Assignee: Link Treasure Limited, Tortola (VG)

( * ) Notice: Subject to any disclaimer, the term of this patent is extended or adjusted under 35 U.S.C. 154(b) by 0 days.

(21) Appl. No.: 09/524,099

(22) Filed: Mar. 13, 2000

(51) Int. Cl.⁷ .................................................. B62B 7/08
(52) U.S. Cl. ............................ 403/84; 403/93; 403/104
(58) Field of Search ............................. 403/83, 84, 85, 403/86, 88, 91, 92, 93, 94, 96, 97, 99, 106, 103, 104, 107, 108; 280/47.371, 47.36

(56) References Cited

U.S. PATENT DOCUMENTS

| | | | | |
|---|---|---|---|---|
| 4,543,006 A | * | 9/1985 | Wang | 403/93 |
| 4,645,371 A | * | 2/1987 | Wang | 403/93 |
| 4,824,278 A | * | 4/1989 | Chang | 403/93 |
| 4,925,329 A | * | 5/1990 | Chuang | 403/93 |
| 5,056,805 A | * | 10/1991 | Wang | 403/93 X |

* cited by examiner

Primary Examiner—Lynne H. Browne
Assistant Examiner—John R. Cottingham
(74) Attorney, Agent, or Firm—W. Wayne Liauh (57) ABSTRACT

A baby stroller having a switchable handle, a tray accessory, and an attachment device for attaching the tray accessory to the handle. The attachment device, which allows the handle to be switchable between a first forward position and a second backward position of the handle The attachment device, which allows the handle to be switchable between a first forward position and a second backward position of the handle while maintaining the tray accessory at the same horizontal level, includes: (a) a cylindrical member sleeved on the handle, the cylindrical member including a circumferential flange protruded from a side face of the cylindrical member and a first channel and a second channel formed inside the circumferential flange, the first and second channels being formed corresponding to the first forward and the second backward positions, respectively, of the handle; (b) an attachment member protruded from each side of the tray accessory, the attachment member being pivotably received by the circumferential flange of the cylindrical member; and (c) a positioning member slidably movable in the attachment member, the positioning member being structured so that it can be received in either the first or the second channel so as secure the tray accessory to the cylindrical member while allowing the handle to switch between the first forward position and the second backward position of the handle and maintaining the tray accessory at a constant horizontal level between the first and the second positions.

21 Claims, 7 Drawing Sheets

ATTACHMENT MECHANISM FOR STROLLER TRAY ACCESSORY

BACKGROUND OF THE INVENTION

1. Field of Invention

The present invention relates to attachment mechanism and, more particularly, to an attachment mechanism for stroller tray accessory, which is always maintained at a horizontal position during the forward-backward switching of the handle.

2. Related Art

Infant strollers have been popular for many years to provide a convenient transportability. Conventionally, most of these strollers are made collapsible or even collapsible with a single hand.

A prior art of the collapsible stroller is disclosed in U.S. Pat. No. 5,257,799 wherein the handle is movable between the first and the second positions. In detail, the occupant of the stroller faces the moving direction (i.e., with its back to the user) in the first position. This is particularly suitable for older infants. On the other hand, the face of the occupant is opposite to the moving direction (i.e., with its face to the user) in the second position. As such, the user of the stroller can monitor the occupant during the use of the stroller. Such design is also disclosed in Taiwanese Patent Publication Nos. 238,635 and 265,717.

But this is unsatisfactory for the purpose that the invention is intended to because no tray accessory is provided.

Another prior art of the stroller having a detachable and rotatable tray accessory is disclosed in U.S. Pat. No. 5,855,384. Food, beverages, children' toys, etc., can be put on the tray portion of this accessory. However, such previous design suffers from a disadvantage; that is, the tray accessory is affixed to the handle for the purpose of increasing the stability of the tray accessory during transportation. As a result, the tray accessory is not appropriate to mount to the handle. This is because the tray accessory may slant to face downward when the position is switched from the first to the second.

In view of the foregoing, such strollers with the function of forward-backward switching usually does not have a mounted tray accessory.

SUMMARY OF THE INVENTION

It is, therefore, an object of the present invention to provide an attachment mechanism for the stroller tray accessory, which is maintained at a horizontal position during the forward-backward switching of the handle.

The advantages of the present invention are realized by providing an attachment mechanism for the stroller tray accessory comprising an attachment means on both sides of the tray accessory, a cylindrical member sleeved on the handle having a circumferential flange pivotably attached to the attachment means, two channels extending from a space coincidental respectively with each handle on a horizontal line, and a positioning means slidingly received in one of the channels for securing the tray accessory to the cylindrical member, thereby effecting a switching between the forward and backward positions of the handle wherein the tray accessory is movable when the positioning means clears one of the channels. By utilizing this, the tray accessory is maintained at a horizontal position during the position switch of the handle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow by illustration only, and thus is not limitative of the present invention, and wherein.

DETAILED DESCRIPTION OF THE INVENTION

Figure 1A:
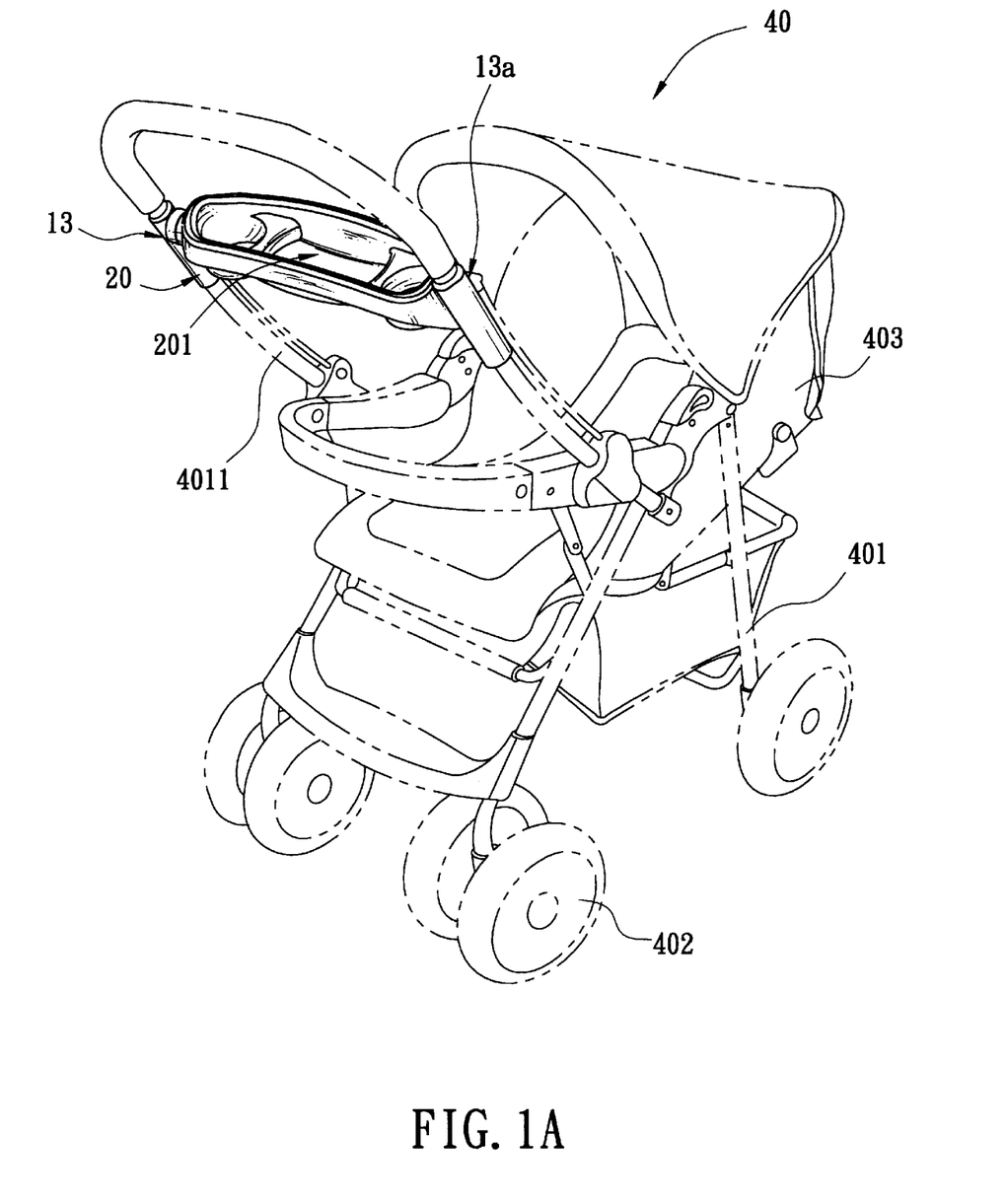
FIG. 1A is a perspective view of a first preferred embodiment of the stroller according to the invention wherein the handle is in the first position.
Figure 1B:
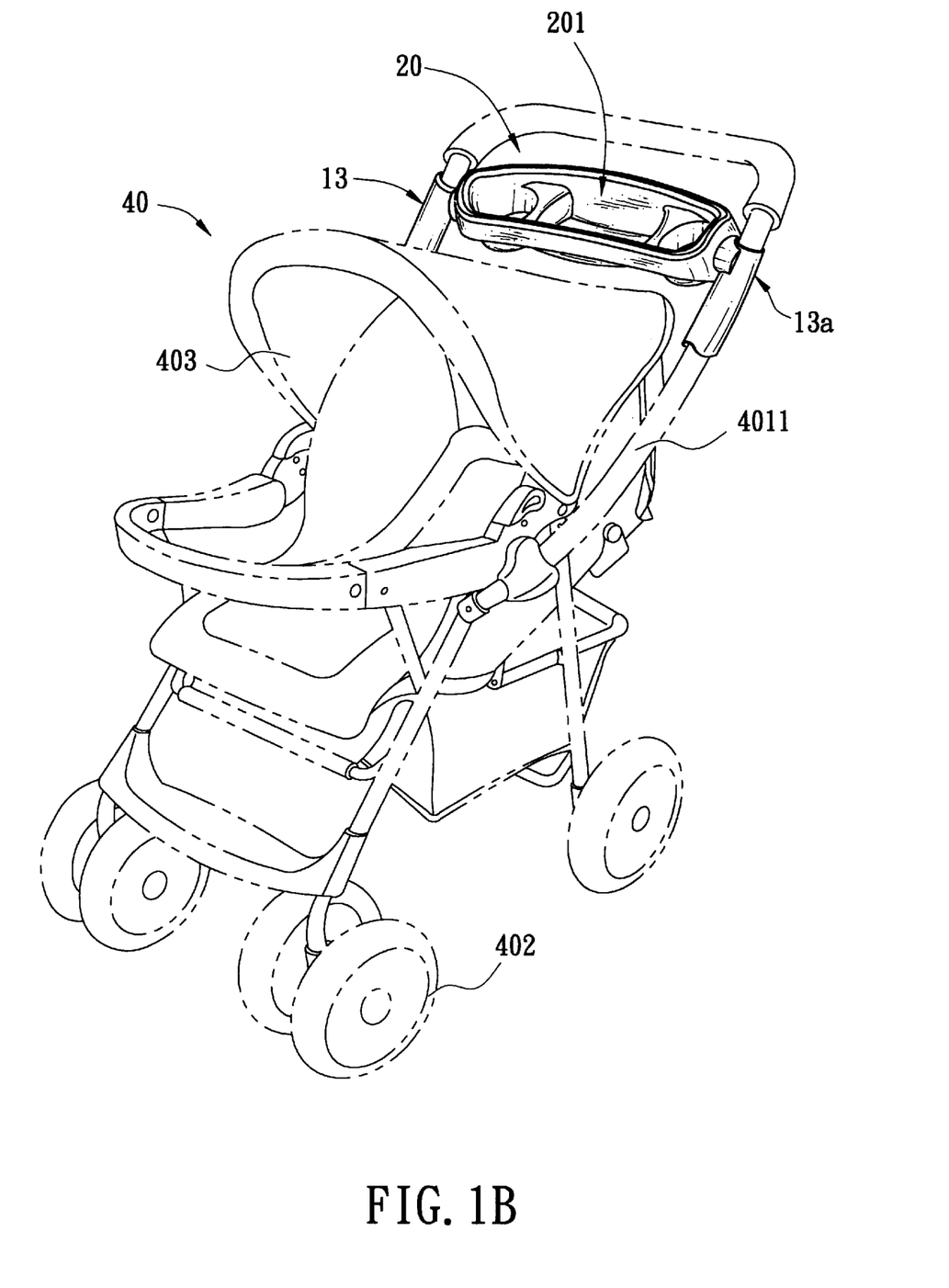
FIG. 1B is similar to FIG. 1 wherein the handle is in the second position.

Referring to FIGS. 1A and 1B, there is shown a stroller 40 constructed in accordance with the invention comprising a supporting frame 401, four-wheel assemblies 402 rotatably mounted thereon the frame 401, and a canopy 403 covering the frame 401. This stroller can provide space for an infant and transportation for the user by way of the wheels 402. The frame 401 of this stroller comprises a handle 4011 for pushing the stroller 40. The handle 4011 is pivotably attached to the frame 401 so as to be positioned in the first position (FIG. 1A) wherein the occupant of the stroller 40 faces the moving direction (i.e., with its back to the user. This is particularly suitable for to-older infants. The handle 4011 is also capable of moving to the second position (FIG. 1B) wherein the face of the occupant is opposite to the moving direction (i.e., with its face to the user. As such, the user of the stroller 40 can monitor the activity of the occupant during the use of the stroller 40. A tray accessory 20 is provided between two straight portions of the handle 4011, having a tray portion 201 for storing food, beverages, children's toys, etc.

FIGS. 2–5 illustrate a first preferred embodiment of the attachment mechanism for the stroller tray accessory according to the invention. The attachment mechanism for the stroller tray accessory comprises an attachment means 11 on both sides of the tray accessory 20, a positioning means 12, and a cylindrical member 13 sleeved on the handle 4011.

Figure 2:
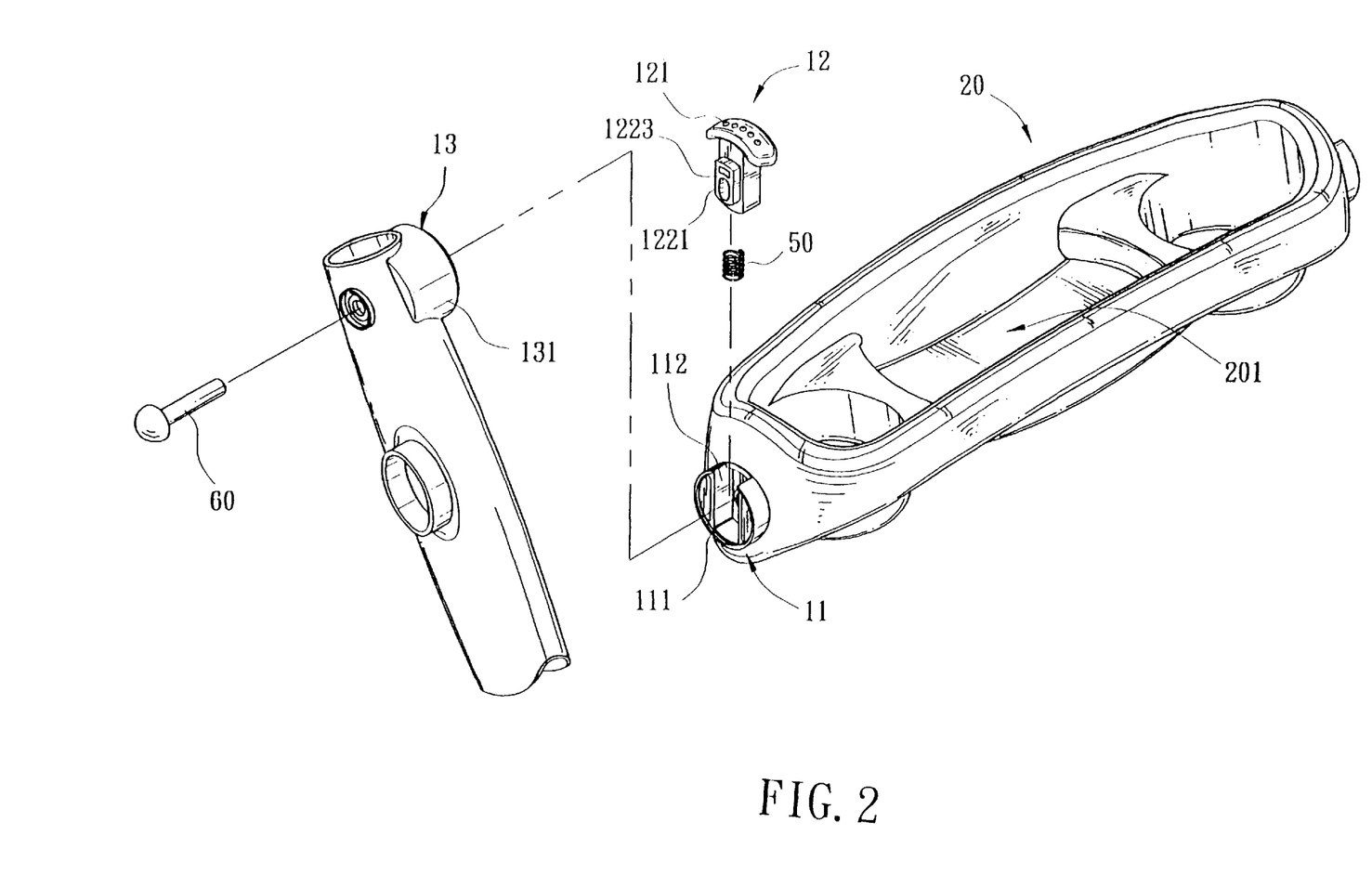
FIG. 2 is an exploded view of attachment mechanism for the stroller tray accessory shown in FIG. A.
Figure 3:
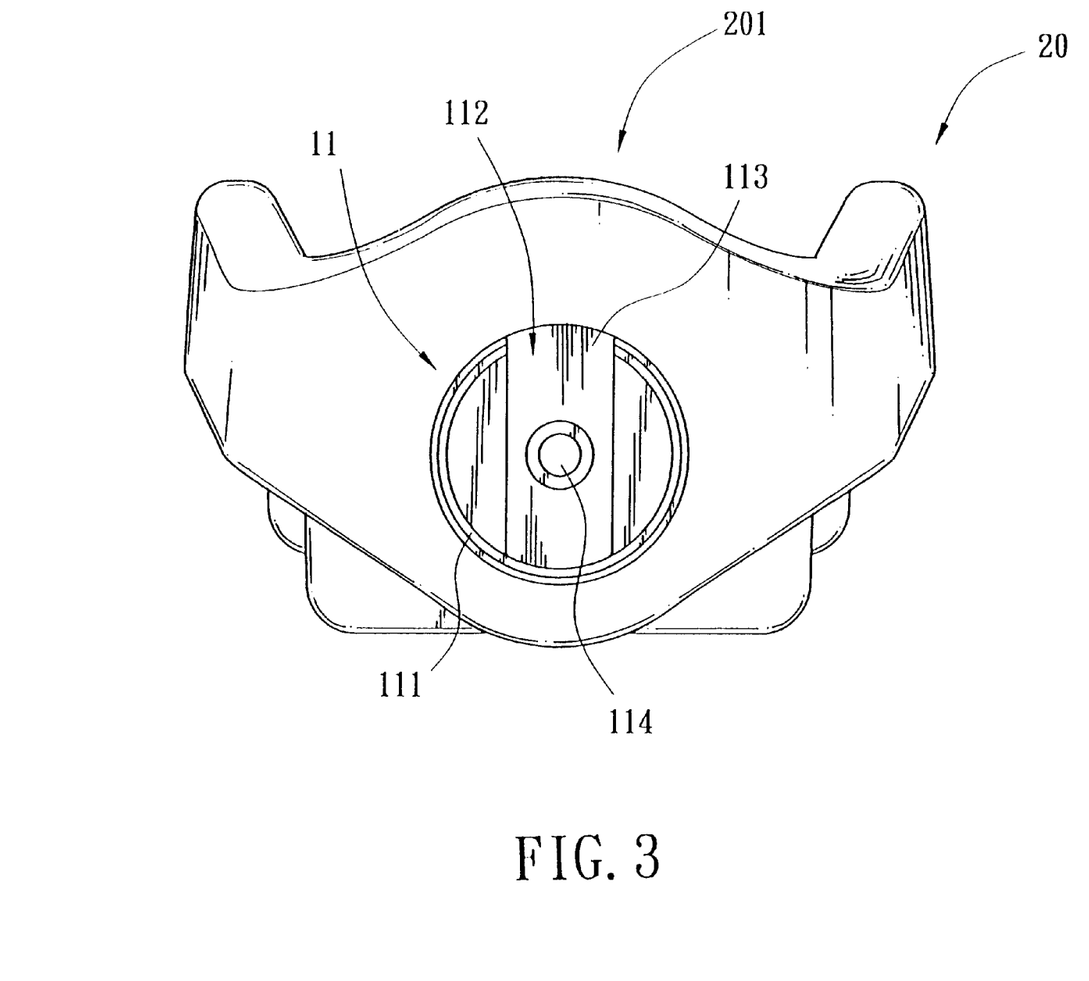
FIG. 3 is an angled view of a side of the tray accessory showing the attachment means.
Figure 4:
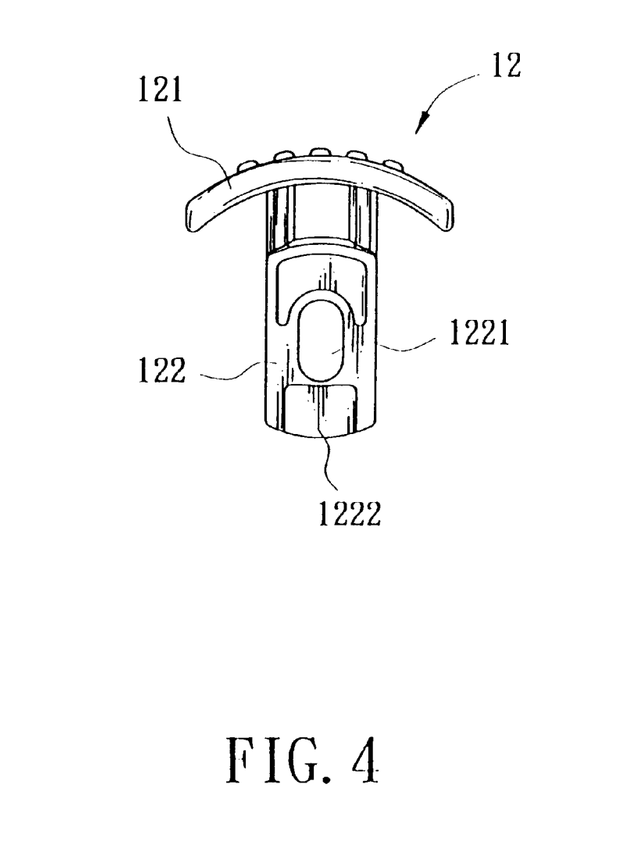
FIG. 4 is a side view of the positioning means.

The attachment means 11 is a generally cylindrical member protruded from the side of the tray accessory 20. The attachment means 11 comprises an annular flange 111 on the joint of the attachment means 11 with the tray accessory 20, a vertical groove 112 having a mouth 113 on the top, and a horizontal hole 114 penetrated into the tray accessory 20 for a predetermined short distance. Preferably, the height of the horizontal hole 114 is higher than the center of the gravity of the tray accessory 20.

The positioning means 12 is generally T-shaped comprising a push button 121, a vertical portion 122 insertable into and movable in the vertical groove 112. The vertical portion 122 has an elongate aperture 1221 in the center thereof corresponding to the horizontal hole 114 and a receptacle 1222 on its bottom. Inside the elongate aperture 1221, a spring 50 exerts an upward force against the vertical portion 122, and a positioning block 1223 projects from the external side of positioning means 12 (see FIG. 4 specifically).

Figure 5:
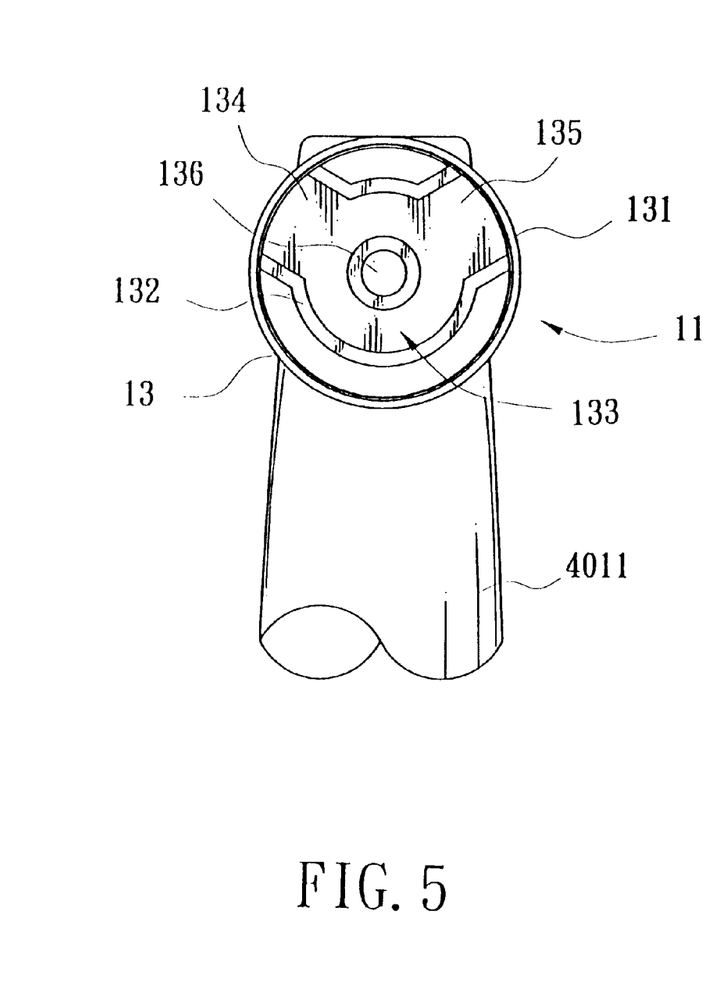
FIG. 5 is a side view of the cylindrical member.

Referring to FIG. 5 specifically, the cylindrical member 13 sleeves on the handle 4011 comprising a circumferential flange 131 having a diameter slightly larger than that of the attachment means 11. As such, the circumferential flange 131 can receive the attachment means 11 with its circumferential edge engaged with the annular flange 111. Thus, the attachment means 11 may be pivotably attached to the cylindrical member 13. The cylindrical member 13 further comprises an inner member 132 enclosing a space 133 slightly larger than the positioning block 1223 and a horizontal hole 136 through the cylindrical member 13 and the circumferential flange 131. A first channel 134 and second channel 135 are extended from the space 133 corresponding to first position and second position of the handle 4011 respectively.

In assembly of the tray accessory 20 to the stroller 40, first put the spring 50 and the positioning means 12 in the vertical groove 112 in place. Then mount the tray accessory 20 to the cylindrical member 13 by attaching the attachment means 11 to the circumferential flange 131. Put a pin 60 through the horizontal hole 136, the elongate aperture 1221, and the horizontal hole 114 to engage with the tray accessory 20. As a result, the positioning block 1223 is received in the inner member 132 of the cylindrical member 13. Further, the attachment means 11 is secured in the cylindrical member 13 when the positioning block 1223 is either in the first channel 134 or second channel 135.

Figures 6A, 6B, 6C:
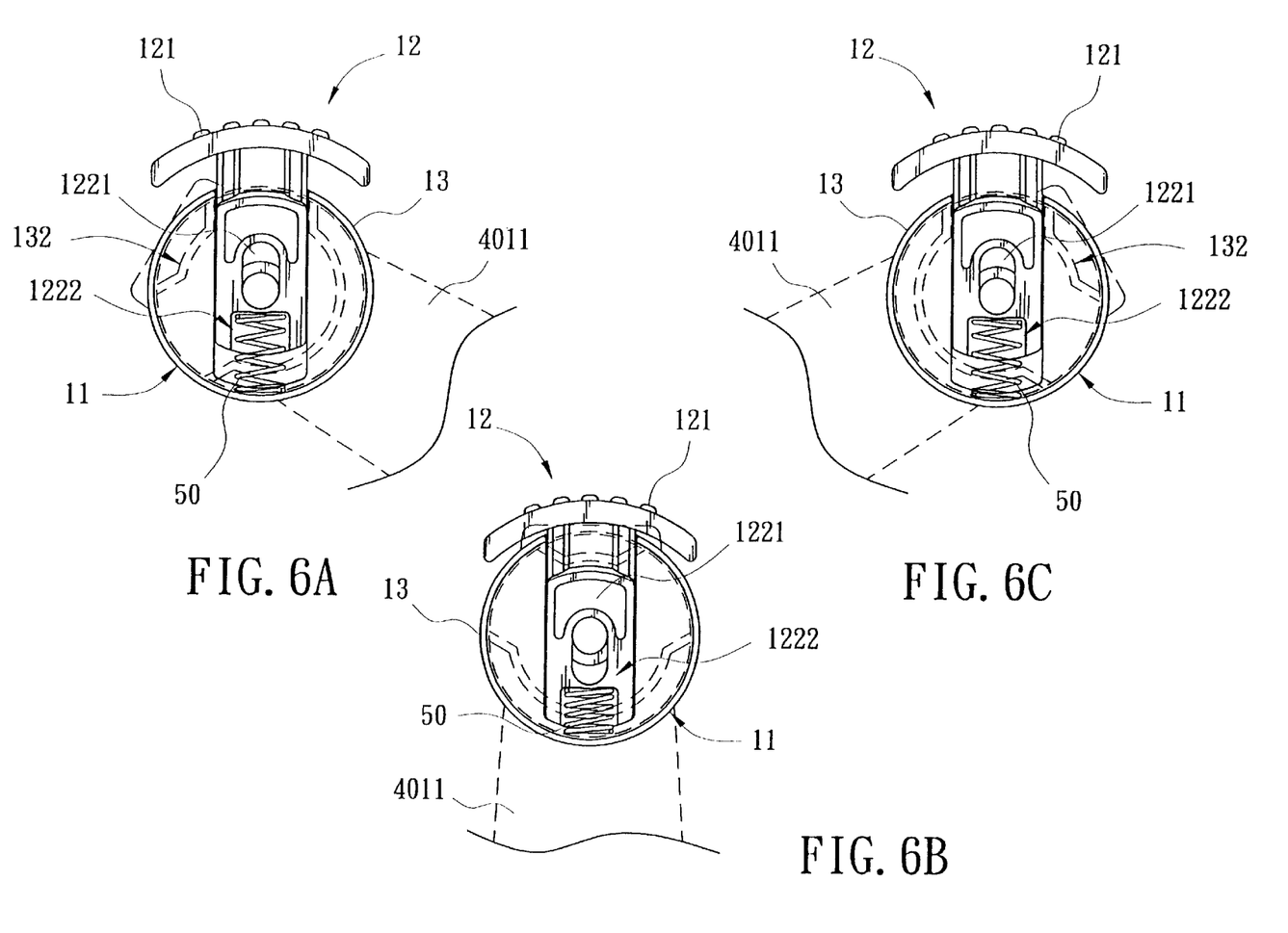
FIGS. 6A, 6B, and 6C are the operational views of the attachment mechanism of the invention.

Referring to FIGS. 6A–6C in conjunction with FIGS. 1A and 1B, a switching position of the handle 4011 is detailed below. In the first position (i.e., the positioning block 1223 is the second channel 135), the second channel 135 is perpendicular to the horizontal line as the attachment means 11 is secured in the cylindrical member 13 by means of the positioning means 12 (see FIG. 6A). In this state, the tray accessory 20 is maintained at a horizontal position.

As for the switching the position of the handle 4011, the user should press the push button 121 to compress the spring 50 in order to disengage the positioning block 1223 from the second channel 135. Once the positioning block 1223 clears the second channel 135, the attachment means 11 is pivotable with respect to the cylindrical member 13 (see FIG. 6B). In this state, the tray accessory 20 is still maintained at a horizontal position without slanting. Note that an additional weight (not shown) may be provided in the bottom of the tray accessory 20 for providing increased stability to the tray accessory 20.

The compressed spring 50 exerts an upward force against the positioning means 12 to cause the positioning block 1223 to move upward and receive in the first channel 134 when the attachment means 11 pivots to align the positioning block 1223 with the first channel 134 and the user then releases the push button 121. In this second position (i.e., the positioning block 1223 is the first channel 134), the first channel 134 is perpendicular to the horizontal line as the cylindrical member 11 is secured in the cylindrical member 13 by means of the positioning means 12 (see FIG. 6C). In this state, the tray accessory 20 is still maintained at a horizontal position.

In view of the above, the tray accessory 20 is always maintained at a horizontal position during the position switching of the handle 4011.

Figures 7A, 7B:
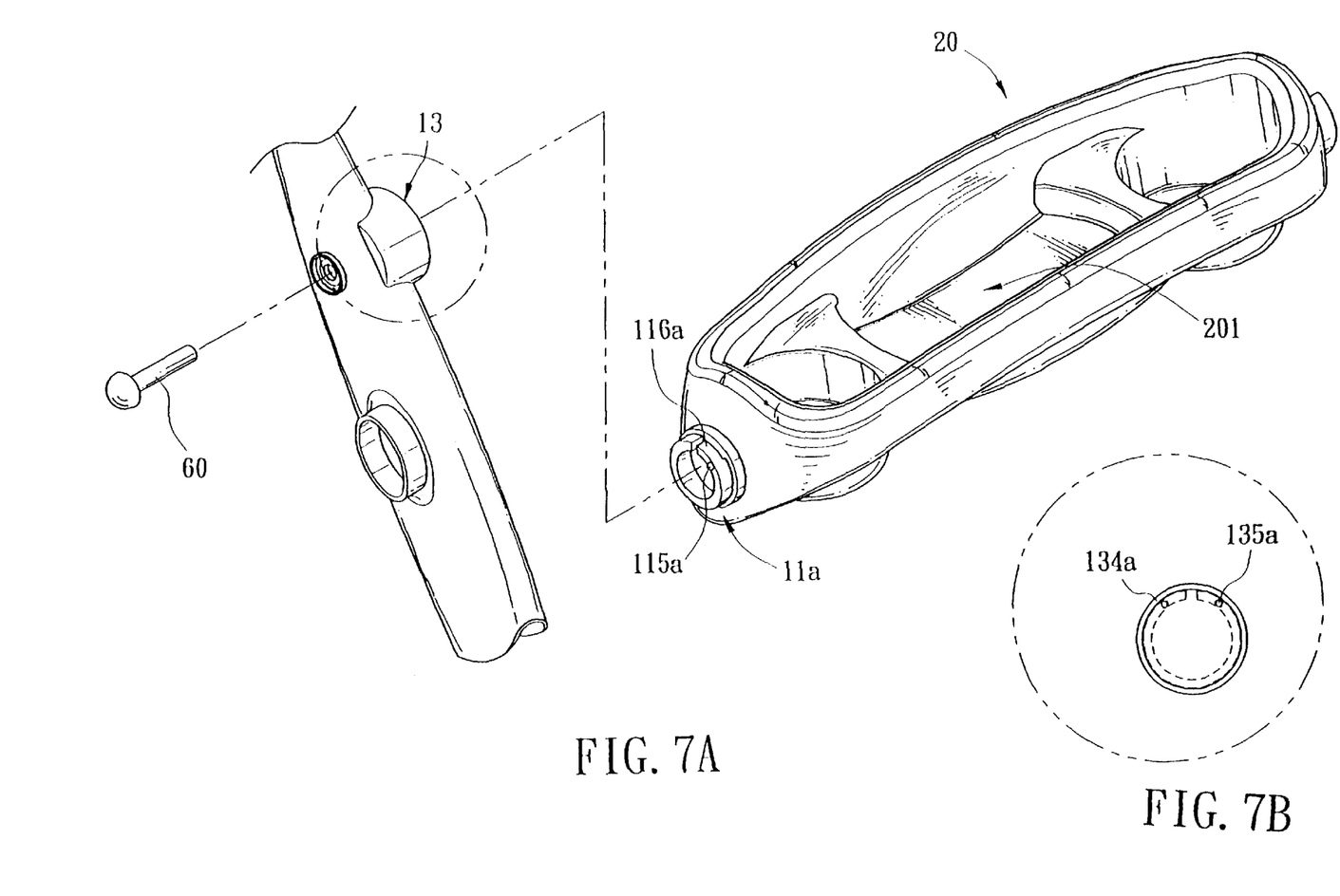
FIG. 7A is an exploded view of a second preferred embodiment of attachment mechanism for the stroller tray accessory according to the invention.
FIG. 7B is a greatly enlarged fragmentary view of the attachment mechanism for the stroller tray accessory shown in FIG. 7A.

FIGS. 7A and 7B illustrate a second preferred embodiment of the attachment mechanism for the stroller tray accessory according to the invention. The attachment means 11a is a split cylindrical member. A gap exists between the attachment means 11a and the tray accessory 20 wherein a resilient member 115a is formed in the gap. A protrusion 116a is formed on the resilient member 115a. A first recess 134a and second recess 135a are formed in the inner member of the cylindrical member 13a corresponding to the first position and second position of the handle 4011 respectively. The first and second recesses 134a and 135a are perpendicular to the horizontal line. Further, the protrusion 116a is received in the first recess 134a when the protrusion 116a is positioned corresponding to the first recess 134a. Similarly, the protrusion 116a is received in the second recess 135a when the protrusion 116a is positioned corresponding to the second recess 135a. The attachment means 11a is secured in either the first recess 134a or second recess 135a. As to the disengagement of the attachment means 11a from either the recess 134a or recess 135a, simply turn the tray accessory 20 to move the recess 134a or 135a out of engagement with the protrusion 116a. Then switch the position of the tray accessory 20. It is also noted that the tray accessory 20 is always maintained at a horizontal position during the position switching of the handle 4011. The second preferred embodiment of the invention can be practiced without the provision of the resilient member 115a by providing the protrusion 116a directly on the attachment means 11a. It simply requires that a sufficient allowance exists between the attachment means 11a and the cylindrical member 13a. Also, it is contemplated that a groove (not shown) is provided in the attachment means 11a. A spring (not shown) is anchored in the groove, while the protrusion 116a is slidingly movable in the groove. This can achieve the same purpose.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An attachment device for attaching a tray accessory to a stroller having a handle switchable between a first forward position and a second backward position, the attachment device comprises:

a cylindrical member sleeved on the handle including a circumferential flange protruded with a first channel and a second channel formed therein;

an attachment means protruded in both sides of the tray accessory pivotably attached to the circumferential flange of the cylindrical member; and a positioning means sliding movable in the attachment means for receiving in either of the channels in order to secure the tray accessory to the cylindrical member, thereby effecting a switching between the first forward position and the second backward position of the handle, while allowing the tray accessory to remain at the same horizontal level when the handle is switched from the first position to the second position.

2. The attachment device of claim 1, wherein the cylindrical member further includes an inner member in the circumferential flange enclosing a space in communication with the first and the second channels, and a horizontal hole.

3. The attachment device of claim 1, wherein the attachment means includes an annular flange on its joint with the tray accessory, a vertical groove having a mouth on the top, and a horizontal hole recessed into the tray accessory for a predetermined distance.

4. The attachment device of claim 3, wherein the positioning means comprises a push button, a spring, and a vertical portion slidingly movable in the vertical groove having an elongate aperture in the center thereof, a receptacle beneath the elongate aperture open to the bottom for receiving the spring, and a positioning block projected from the side facing the cylindrical member.

5. The attachment device of claim 3, further comprising a pin inserted through the horizontal hole of the cylindrical member, the elongate aperture of the positioning means, and the horizontal hole of the attachment means to engage with the tray accessory.

6. The attachment device of claim 1, wherein the attachment means is a split cylindrical member having a gap existing between the attachment means and the tray accessory, a resilient member formed in the gap, and a protrusion formed on the resilient member.

7. The attachment device of claim 3, further comprising a first recess and second recess in the inner member of the cylindrical member corresponding to the first position and the second position of the handle respectively.

8. A baby stroller having a switchable handle, a tray accessory, and an attachment device for attaching the tray accessory to the handle, the handle being switchable between a first forward position and a second backward position of the handle, and the attachment device comprising:

(a) a cylindrical member sleeved on the handle, the cylindrical member including a circumferential flange protruded from a side face of the cylindrical member and a first channel and a second channel formed inside the circumferential flange, the first and second channels being formed corresponding to the first and the second positions, respectively, of the handle;

(b) an attachment member protruded from each side of the tray accessory, the attachment member being pivotably received by the circumferential flange of the cylindrical member; and (c) a positioning member slidably movable in the attachment member, the positioning member being structured so that it can be received in either the first or the second channel, so as secure the tray accessory to the cylindrical member while allowing the handle to switch between the first position and the second position of the handle and maintaining the tray accessory at the same horizontal level when the handle is switched from the first position to the second position.

9. The baby stroller of claim 8, wherein the cylindrical member further includes an inner member in the circumferential flange enclosing a space in communication with the first and the second channels, and a horizontal hole.

10. The baby stroller of claim 1, wherein the attachment member includes an annular flange on its joint with the tray accessory, a vertical groove having a mouth on the top, and a horizontal hole recessed into the tray accessory.

11. The baby stroller of claim 10, wherein the positioning member comprises a push button, a spring, and a vertical portion slidingly movable in the vertical groove having an elongate aperture in the center thereof, a receptacle beneath the elongate aperture open to the bottom for receiving the spring, and a positioning block projected from the side facing the cylindrical member.

12. The baby stroller of claim 10, further comprising a pin inserted through the horizontal hole of the cylindrical member, the elongate aperture of the positioning member, and the horizontal hole of the attachment member to engage with the tray accessory.

13. The baby stroller of claim 10, wherein the attachment member is a split cylindrical member having a gap existedexisting between the attachment member and the tray accessory, a resilient member formed in the gap, and a protrusion formed on the resilient member.

14. The baby stroller of claim 10, further comprising a first recess and second recess in the inner member of the cylindrical member corresponding to the first position and the second position of the handle respectively.

15. An attachment device for use in a baby stroller, the baby stroller having a switchable handle, a tray accessory, and an attachment device for attaching the tray accessory to the handle, the handle being switchable between a first forward position and a second backward position of the handle, and the attachment device comprising:

(a) a cylindrical member sleeved on the handle, the cylindrical member including a circumferential flange protruded from a side face of the cylindrical member and a first channel and a second channel formed inside the circumferential flange, the first and second channels being formed corresponding to the first and the second positions, respectively, of the handle;

(b) an attachment member protruded from each side of the tray accessory, the attachment member being pivotably received by the circumferential flange of the cylindrical member; and (c) a positioning member slidably movable in the attachment member, the positioning member being structured so that it can be received in either the first or the second channel, so as secure the tray accessory to the cylindrical member while allowing the handle to switch between the first position and the second position of the handle and maintaining the tray accessory at the same horizontal level when the handle is switched from the first position to the second position.

16. The attachment device for use in a baby stroller of claim 15, wherein the cylindrical member further includes an inner member in the circumferential flange enclosing a space in communication with the first and the second channels, and a horizontal hole.

17. The attachment device for use in a baby stroller of claim 15, wherein the attachment member includes an annular-flange on its joint with the tray accessory, a vertical groove having a mouth on the top, and a horizontal hole recessed into the tray accessory.

18. The attachment device for use in a baby stroller of claim 17, wherein the positioning member comprises a push button, a spring, and a vertical portion slidingly movable in the vertical groove having an elongate aperture in the center thereof, a receptacle beneath the elongate aperture open to the bottom for receiving the spring, and a positioning block projected from the side facing the cylindrical member.

19. The attachment device for use in a baby stroller of claim 17, further comprising a pin inserted through the horizontal hole of the cylindrical member, the elongate aperture of the positioning member, and the horizontal hole of the attachment member to engage with the tray accessory.

20. The attachment device for use in a baby stroller of claim 17, wherein the attachment member is a split cylindrical member having a gap existedexisting between the attachment member and the tray accessory, a resilient member formed in the gap, and a protrusion formed on the resilient member.

21. The attachment device for use in a baby stroller of claim 17, further comprising a first recess and second recess in the inner member of the cylindrical member corresponding to the first position and the second position of the handle respectively.

* * * * *